Patented June 17, 1947

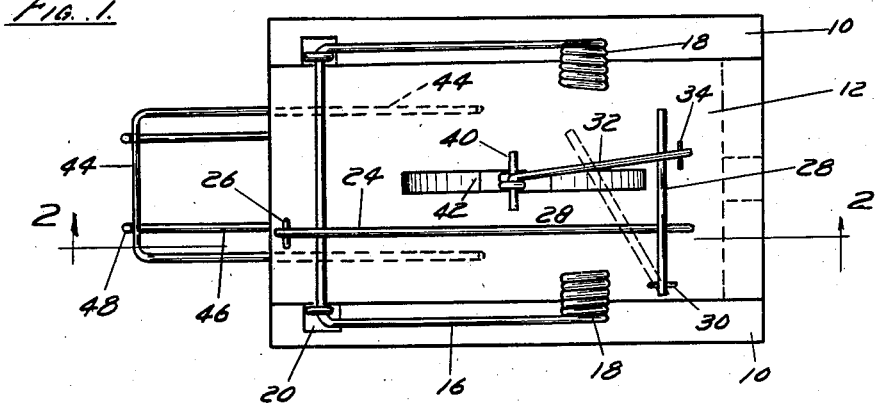

2,422,602

UNITED STATES PATENT OFFICE 2,422,602

ANIMAL TRAP

John L. Vallely, Los Angeles, Calif.

Application April 10, 1944, Serial No. 530,377

3 Claims. (Cl. 43—85)

This invention relates to an improved animal trap and has, for one of its principal objects, the provision of a trap which is particularly well adapted for catching gophers and other small animals of the rodent species.

One of the important objects of this invention is to provide an improved gopher or rodent trap which shall be more nearly escape-proof than the ordinary trap, and which will not be so likely to be inadvertently sprung without trapping the animal, and more capable of trapping the animal that is wary of actually entering traps.

Another important object of the invention resides in the provision of a small animal trap of the trigger-operated spring type whereby the tension on the trigger and also on the spring catch, for that matter, can be regulated. In this manner different and various contingencies may be handled.

Other and further important objects of the invention will be apparent from the disclosures in the accompanying drawing and following specification.

The invention, in a preferred form, is shown in the drawings and hereinafter more fully described.

In the drawings:

Figure 1 is a top plan view of the improved rodent trap of this invention, certain parts and positions being illustrated in dotted lines.

Figure 2 is a sectional view taken on the line 2—2 of Figure 1, with the operation illustrated in dotted lines.

Figure 3 is a front elevation of the improved trap of this invention, parts being broken away showing the operation.

As shown in the drawings:

The reference numerals 10 indicate generally the side walls of the improved trap of this invention, the side walls being provided with a top or cover element 12 and a back piece 14, there being no bottom. Obviously, the trap may be of different shapes and sizes and may have a bottom, if desired.

Certain portions of the trap are conventional as, for example, the yoke 16 which is of spring metal and terminates in coiled spring elements 18 positioned in such a manner that the tendency of the yoke 16 is to spring upwardly as illustrated by the dotted lines in Figures 2 and 3.

Attached to the yoke 16 at its forward portion and extending downwardly through slots 20 formed in the side walls 10 is a loop 22 which is U-shaped, as best shown in Figure 3, and is adapted to catch the animal when the trap is sprung.

A locking bar 24 is fastened in a staple 26 on the front portion of the cover 12 and extends rearwardly, as best illustrated in Figure 1, to almost the length of the trap. Adjacent the rear end of the bar 24 is another bar 28 held in place by means of a staple 30 and adapted to be placed in a cross-wise position over the rear end of the bar 24. This bar 28 can be swung through quite an angle, as best illustrated by the dotted lines in Figure 1, and it is held in position by means of a trigger bar 32 which is mounted on the top 12 of the trap by means of a staple 34. This trigger bar 32 has its forward end bent, as shown in Figure 1, so as to be hooked under the corresponding bent top end 36 of a trigger element 38 which is preferably shaped as shown in Figure 3, but which obviously can be of some other shape. This trigger element is pivoted on a cross-bar at 40 which extends across a slot 42 cut in the top of the trap.

Mounted in the under-face of the top of the trap is a U-shaped bar 44, and this U-shaped bar extends forwardly from the trap as illustrated in Figure 1. The bar 44 is held in position by staples 45 driven into the underface of the top of the trap.

Welded or otherwise affixed to the U-shaped loop 22 at the lower end thereof is a pair of pronged elements 46 terminating in upwardly bent points 48 as best shown in Figure 2. The purpose of this fixed loop 44 which co-operates with the travelling bars 46—48 is to provide means of catching a rodent that may spring the trigger without entering the trap as, for example, by pushing earth ahead of it. Both of these bars project a desired distance beyond the entrance to the trap, the fixed bar or loop 44 being permanently attached to the under-face of the top of the trap, and the traveling bars 46—48 being welded to the U-shaped loop 22 so that when the trap is sprung and the yoke is jerked upward, the traveling bars catch the rodent and push it against the fixed bar, holding it against escape.

The purpose of the leverage bars 24 and 28 is to increase or diminish the degree of tension on the trigger, as, for example, when the leverage bar 28 is moved toward the rear, the minimum of tension is exerted and vice versa.

In use, the trap is set in the usual manner by depressing the yoke and catching the trigger release under the trigger with the leverage bar 24 over the yoke and with the rear end of the leverage bar 24 under the corresponding leverage bar 28 and with the trigger bar 32 over the free end of the leverage bar 28. The leverage bar 28 is then moved backward or forward to secure the desired tension or trigger action.

I am aware that many changes may be made and numerous details of construction varied throughout a wide range without departing from the principles of this invention, and I, therefore, do not purpose limiting the patent granted herein otherwise than as necessitated by the prior art.

I claim as my invention:

1. A rodent trap comprising a housing having side walls, a rear wall and a top, a spring-pressed yoke mounted on the top, a loop connected to the yoke and moving in grooves in the inner faces of the side walls, an extension in the loop, a member co-operating with said extension, said member mounted in the top of the trap, a trigger pivotally mounted in the top of the trap, and a trigger bar and connected leverage bars connecting the trigger to the yoke, said leverage bars including a bar pivoted at the front end of the trap and passing over the yoke and extending rearwardly, and another bar pivoted at one side of the rear end of the top and crossing the first leverage bar and adapted to be moved rearwardly and forwardly thereover for tension adjustments.

2. A rodent trap comprising a housing having side walls, a rear wall and a top, a spring-pressed yoke mounted on the top, a loop connected to the yoke, grooves in the inner faces of the side walls for slidable reception of the loop, an extension on the loop, said extension projecting forwardly from the trap, a co-operating extension mounted in the under face of the top of the trap, a trigger pivotally mounted in the top of the trap, and a trigger bar and connected leverage bars connecting the trigger to the yoke, said leverage bars including a bar pivoted at the front end of the trap and passing over the yoke and extending rearwardly, another bar pivoted at one side of the rear end of the top and crossing the first leverage bar and adapted to be moved rearwardly and forwardly thereover for tension adjustments, and a trigger bar pivotally mounted at the rear end of the top of the trap adapted to be placed over the free end of the transverse leverage bar.

3. A rodent trap comprising a housing having side walls, a rear wall and a top, a spring-pressed yoke mounted on the top, a loop connected to the yoke and moving in grooves in the inner faces of the side walls, a trigger pivotally mounted in the top of the trap, and a trigger bar and connected leverage bars connecting the trigger to the yoke, said leverage bars including a bar pivoted at the front end of the trap and passing over the yoke and extending rearwardly, another bar pivoted at one side of the rear end of the top and crossing the first leverage bar and adapted to be moved rearwardly and forwardly thereover for tension adjustments, and a trigger bar pivotally mounted at the rear end of the top of the trap adapted to be placed over the free end of the transverse leverage bar and with its free end adapted to be contacted and caught by the upper end of the trigger element.

JOHN L. VALLELY.

REFERENCES CITED

The following references are of record in the file of this patent:

UNITED STATES PATENTS

| Number | Name | Date |
|---|---|---|
| 621,396 | Williams | Mar. 21, 1890 |
| 150,860 | Hukill | May 12, 1874 |
| 1,366,995 | Wolfe | Feb. 1, 1921 |
| 1,241,426 | Nelson | Sept. 25, 1917 |